Sept. 13, 1955  V. L. PARSEGIAN ET AL  2,717,964
SULFUR CRYSTAL COUNTER
Filed Feb. 26, 1952
FIG. 1.
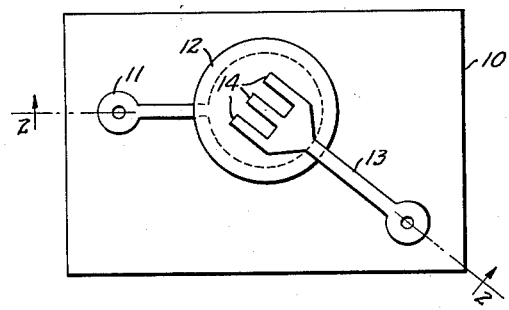
FIG. 2.
FIG. 3.
FIG. 4.
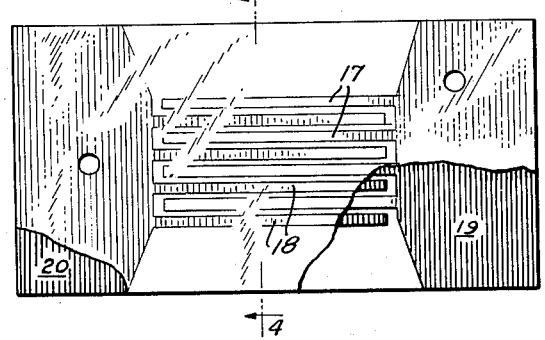
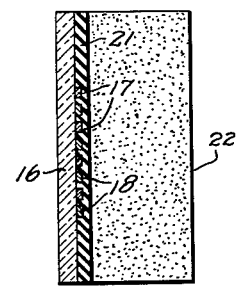
FIG. 5.
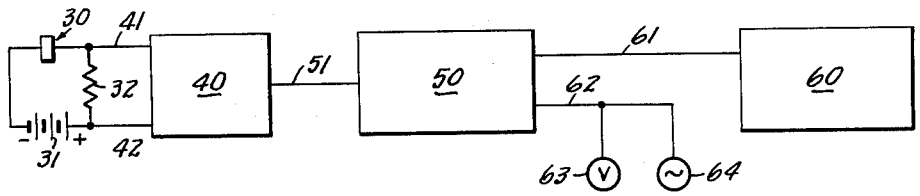
INVENTOR.
VOZCAN LAWRENCE PARSEGIAN
RALPH CARROL MANINGER
BY
Roland A. Anderson
ATTORNEY United States Patent Office 2,717,964
Patented Sept. 13, 1955

2,717,964

SULFUR CRYSTAL COUNTER

Vozcan Lawrence Parsegian, Brooklyn, N. Y., and Ralph Carrol Maninger, Montvale, N. J., assignors to the United States of America as represented by the United States Atomic Energy Commission Application February 26, 1952, Serial No. 273,488

5 Claims. (Cl. 250—83.3)

This invention relates to a new and improved apparatus for the detection of radioactive particles. With the increasing use of radioactive substances, new types of radiation detectors have to be developed to provide better accuracy and sensitivity than is presently available in conventional instruments. Crystal counters have been investigated because they offer several advantages. They are small in size and, therefore, permit good counting geometry in experiments. Their low resolving time allows both high-speed counting and fast coincidence counting. However, crystal counters now being used are no more sensitive than the more conventional ionization chambers. That is, the conversion of energy from radioactive particles into ion pairs takes place at the same rate for the ionization chamber as for the usual crystal counter. On the other hand, an apparatus embodying the present invention has a much higher rate of energy conversion in addition to the other advantages attributable to crystal counters. This higher energy conversion results in a more efficient counter and a higher signal-to-noise ratio.

An apparatus can also be fabricated, using the method of the present invention, which will be capable of detecting and measuring alpha particles in the presence of high level beta and gamma radiation.

It is accordingly an object of the present invention to provide a new and improved crystal counter for radioactive particles.

A second object is to provide a new and improved sulfur crystal counter.

Another object of the invention is to provide a polycrystalline sulfur counter which will detect and measure alpha particles in the presence of intense fields of beta and gamma radiation.

More particularly the present invention relates to an apparatus for the detection of radioactive particles which includes a polycrystalline sulfur film, two electrically conductive electrodes contiguous with the sulfur film, means for establishing a potential difference between the electrodes and means for measuring current flow between the electrodes.

The many objects and adavntages of the present invention may best be appreciated by reference to the accompanying drawings, the figures of which illustrate apparatus incorporating preferred embodiments of the present invention and capable of carrying out the method of the invention. In the drawings:

Figure 1 is a plan view of a preferred embodiment of the apparatus.

Figure 2 is a sectional view taken along the line 2—2 of Figure 1.

Figure 3 is a plan view of a second embodiment of the apparatus.

Figure 4 is a sectional view taken along the line 4—4 of Figure 3.

Figure 5 is a schematic diagram showing the relationship between the crystal counter of the present invention and conventional electronic apparatus for measuring the response of the counter.

Referring to Figures 1 and 2, the counter is fabricated on a glass slide 10. On the upper surface of slide 10 is evaporated an electrically conductive coating to form electrode 11. Electrode 11 is contiguous with the underside of a polycrystalline film of sulfur 12 deposited thereon. Evaporated on to the other side of sulfur film 12 is a fork-shaped electrode 13 containing finger-like extensions 14. For the purposes of clarity, the thickness of the component parts of the counter shown in Figure 2 has been greatly enlarged. It is also apparent that electrodes of any shape may be formed by properly masking the other parts of the counter while the electrode evaporation and deposition is taking place. It should be noted that the finger-like extensions 14 on electrode 13, while providing good electrical contact with the sulfur film 12, also provide a small area with respect to electrode 11. Therefore, a minimum of electrical capacity is achieved while still maintaining good electrical conduction characteristics.

In operation, a difference of potential is applied between electrodes 11 and 13 by any suitable leads, not shown. Under normal conditions sulfur acts as an electrical insulator so that no conduction of current between electrodes 11 and 13 will occur. However, we have found that when the sulfur is placed in a radioactive field, radioactive particles impinging on the sulfur will form ion pairs therein and provide a current conduction path between electrodes 11 and 13. Therefore, by measuring the amplitude and the rate of occurrence of the resulting current pulses between electrodes 11 and 13, an indication of the intensity level of the radiation field is obtained.

Referring to Figure 5, a block diagram of an apparatus for measuring the response of the counter is shown. The counter, indicated generally by the arrow 30, has one side connected to the negative side of a direct current power supply 31. The other side of the counter is connected to the positive side of supply 31 through a resistor 32. Across resistor 32 is connected the input of a conventional low noise preamplifier 40 by means of conductors 41 and 42. The output of preamplifier 40 is connected to the input of a conventional linear amplifier 50 through conductor 51. The amplifier 50 output is applied to a scaler 60 by means of conductor 61 and is also applied on conductor 62 to a voltmeter 63 and an oscilloscope 64.

When the crystal counter is placed in a radioactive field, the radioactive particles impinging on counter 30, form a conductance path, as described herein above, with a resulting current flow between the electrodes. The current passing through resistor 32 gives rise to a voltage pulse applied to the input of preamplifier 40 by means of conductors 41 and 42. The amplified pulse is applied on conductor 51 to amplifier 50 where further amplification takes place. The output of amplifier 50 is applied through conductor 61 to scaler 60 where it is counted and recorded. By recording the number of current pulses occurring in a measured time interval, it is possible to determine the number of particles per second arriving at the counter 30. The amplitude of the output pulse of amplifier 50 can be measured by either voltmeter 63 or oscilloscope 64.

Electronic instruments which have been found satisfactory for measuring the output pulses of the sulfur counter are a Model 204-B linear amplifier manufactured by the Atomic Instrument Company of Boston, Massachusetts, and a Model GS-6 scaler manufactured by the Technical Associates Company of Glendale, California. Measuring instruments such as the Hewlett Packard Type 400A Vacuum Tube Voltmeter and the Dumont Type 208 oscilloscope can also be used.

Another form of sulfur counter embodying the present invention is shown in Figures 3 and 4. In this embodiment the crystal counter is mounted on a glass plate 16 and is fabricated in the following manner: The plate glass 16 is coated completely with an electrically conductive plating such as aluminum. An interlacing finger-like electrode structure is scribed in the aluminum to form a plurality of lateral extensions or "fingers" 17 and 18 spaced from each other. All of the "fingers" 17 are connected to a section 19 of the solid coating and the "fingers" 18 are connected to a section 20. A polycrystalline sulfur film 21 is then deposited over the entire electrode structure and between the "fingers" 17 and 18. In this embodiment, therefore, both electrodes are on the same side of the sulfur film but are electrically insulated from one another. This electrode structure again has the advantage that adjacent electrode areas are very small, thereby providing minimum electrical capacitance therebetween but still permitting a good electrical conductance path. This embodiment operates in the same manner as the counter described with respect to Figures 1 and 2. The impinging radioactive particles release ions in the sulfur film and provide conductance paths between adjacent electrodes. The resulting current flow may be measured with the circuit of Figure 5 or any similar conventional current measuring circuit.

If the polycrystalline sulfur film is deposited in a very thin layer, for example, in the order of 20 to 40 microns thick, excellent discrimination between alpha particles and beta and gamma radiation results. The beta and gamma particles pass through the thin sulfur film without any effect but the less penetrating alpha particle will be absorbed in the sulfur film. The resulting conduction current between the electrodes is due solely to the ion pairs formed by the alpha particles.

In the usual crystal counter or air ionization chamber, an alpha particle with an energy of two million electron volts will form approximately fifty-seven thousand ion pairs or one ion pair for approximately every thirty-five electron volts. On the other hand, a polycrystalline sulfur counter fabricated in the manner described herein can form approximately three hundred thousand ion pairs in response to an alpha particle of one million electron volts or one ion pair for approximately every six electron volts. The sulfur crystal counter is, therefore, approximately six times as sensitive as the usual crystal counter.

Typical dimensions of a counter that has operated satisfactorily is a sulfur film thickness of thirty-five microns with spacing between electrode "fingers" of ten to one hundred microns. The difference of potential applied between electrodes was four hundred and seventy volts.

The sulfur crystal counter can also be used as part of an improved scintillation counter by depositing a luminescent material 22 such as anthracene on the sulfur film 21 of Figure 4. It is known that radioactive particles impinging upon such a luminescent material will cause it to emit photons. It has been found that the response of thin polycrystalline films of sulfur to photons is similar to that above-described for radioactive particles. Therefore, the sulfur crystal will release an amount of ions proportional to the number of impinging photons. The ions can be detected by a circuit such as the one shown in Figure 5. The subject counter can, therefore, be used in a manner similar to more expensive photomultiplier tubes but occupying a much smaller space than presently available tubes.

While the salient features of this invention have been described in detail with respect to a few embodiments, it will, of course, be apparent that numerous modifications may be made within the spirit and scope of this invention and it is, therefore, not desired to limit the invention to the exact details shown except in so far as they may be defined in the following claims.

We claim:

1. Apparatus for the detection of radioactive particles which comprises, in combination, a polycrystalline sulfur film in its normal non-conductive state, two electrodes mounted on said film and making electrical contact therewith, said electrodes being insulated from one another, means for establishing a potential difference between said electrodes whereby the impingement of said radioactive particles on said sulfur film places said film in a conductive state and means for measuring current flowing between the electrodes.

2. Apparatus for the detection of radioactive particles which comprises, in combination, a polycrystalline sulfur film in its normal non-conductive state, two electrodes mounted on opposite sides of said sulfur film and making electrical contact therewith, means for establishing a potential difference between said electrodes whereby the impingement of said radioactive particles on said sulfur film causes said film to become conductive and means for measuring current flowing between the electrodes.

3. Apparatus for the detection of radioactive particles which comprises, in combination, a polycrystalline sulfur film, two electrodes mounted on one side of said sulfur film and making electrical contact therewith, said electrodes being electrically insulated from one another and having interlocking finger-like lateral extensions, means for establishing a potential difference between said electrodes and means for measuring current flowing between the electrodes.

4. The apparatus of claim 3 wherein a luminescent material is mounted on said sulfur film.

5. Apparatus for the detection of alpha particles in the presence of strong fields of beta and gamma radiation which comprises, in combination, a polycrystalline film of sulfur between 20 and 40 microns in thickness, said sulfur film being in its normal non-conductive state, a first electrode making electrical contact with said sulfur film, a second electrode making electrical contact with said sulfur film, said first and second electrodes being insulated from one another, means for applying a potential difference between said electrodes whereby impingement of said radioactive particles on said sulfur film causes said film to become electrically conductive and means for measuring current flowing between said electrodes.

References Cited in the file of this patent

UNITED STATES PATENTS

| 2,221,596 | Lorenz | Nov. 12, 1940 |
| 2,241,908 | Herrmann | May 13, 1941 |
| 2,254,429 | Kreutzer | Sept. 2, 1941 |
| 2,261,725 | Hoppe | Nov. 4, 1941 |
| 2,537,388 | Wooldridge | Jan. 9, 1951 |